United States Patent [19]

Jacubowiez

[11] 4,397,600
[45] Aug. 9, 1983

[54] DEVICE FOR FEEDING MATERIAL TO A FURNACE

[75] Inventor: Isidore Jacubowiez, Paris, France

[73] Assignee: Midland-Ross Corporation, Cleveland, Ohio

[21] Appl. No.: 252,953

[22] Filed: Apr. 10, 1981

[51] Int. Cl.³ .................. B65G 25/04; B65G 29/00
[52] U.S. Cl. ................................. 414/152; 198/489;
  198/492; 414/156; 414/173
[58] Field of Search ............ 198/489, 490, 491, 492;
  209/911, 914, 919, 921; 414/150, 152, 153, 156,
  173, 209, 210, 745, 748; 432/122

[56]  References Cited
U.S. PATENT DOCUMENTS

| 2,648,298 | 8/1953 | Holbeck | 198/491 X |
| 2,945,601 | 7/1960 | Evans | 414/748 |
| 3,144,139 | 8/1964 | Chapellier | 414/748 |
| 3,497,084 | 2/1970 | Murrah | 414/745 X |
| 3,757,927 | 9/1973 | Gable et al. | 414/748 X |
| 4,044,893 | 8/1977 | Ekholm et al. | 414/748 X |

Primary Examiner—Bruce H. Stoner, Jr.
Assistant Examiner—David F. Hubbuch
Attorney, Agent, or Firm—H. Duane Switzer

[57] ABSTRACT

A device is described for feeding bars and tubes into a treatment furnace. The device comprises a rotary drum positioned in front of a long horizontal opening provided in the sidewall of the furnace for receiving a bar and introducing it into the furnace through the opening. The device is characterized by a pair of arms which are articulated around an axis outside the furnace and parallel with the drum and which are designed to receive the bars supplied by the drum and to lay them gently down in the furnace, e.g. on the walking beams of a walking beam furnace.

4 Claims, 4 Drawing Figures

DEVICE FOR FEEDING MATERIAL TO A FURNACE

BACKGROUND OF THE INVENTION

The invention is an improvement in a feeding device that comprises a rotary drum for receiving and charging material, e.g. metallic bars and tubes, into the heat treatment chamber of a furnace through a horizontally extending opening in the side of the furnace. The support bed or walking beams of, for example, a walking beam furnace, are highly susceptible to damage caused by the abrupt manner in which the material is charged into the furnace. The invention is directed to the provision of a smooth transition of the material from the charging apparatus or drum to the heat treatment chamber of the furnace.

Briefly stated, the invention is in a device for transferring material from a rotary drum charging apparatus to the support bed of the material within the heat treatment chamber of a furnace. The transfer device comprises a pair of arms which are articulated around an axis that is outside the furnace and parallel with the drum, and which are designated to receive the material supplied by the drum and gently lay it down inside the furnace, e.g. on the walking beams of a walking beam furnace.

According to another aspect of the invention, a retractable stop is located adjacent a material receiving cavity in the drum to maintain the material in the cavity during rotation of the drums and effect a smoother transition of the material to the transfer arms when the stops are retracted to allow movement of the material onto the transfer arms.

According to another variation of the latter described aspect of the invention, the shape of the drum cavity is chosen so that the charging or discharging is performed by sliding of the material on two practically orthogonal planar surfaces, when the material has a rectangular cross-section.

It is important to prevent the escape of heated gas from the furnace, or to prevent cold air from entering the furnace. It has been found advantageous in this regard to utilize the transfer arms as a means of removing material from within the furnace.

DESCRIPTION OF THE DRAWING

The following description of the invention will be better understood by having reference to the accompanying drawing, wherein.

DETAILED DESCRIPTION OF THE DRAWING

Figure 1:
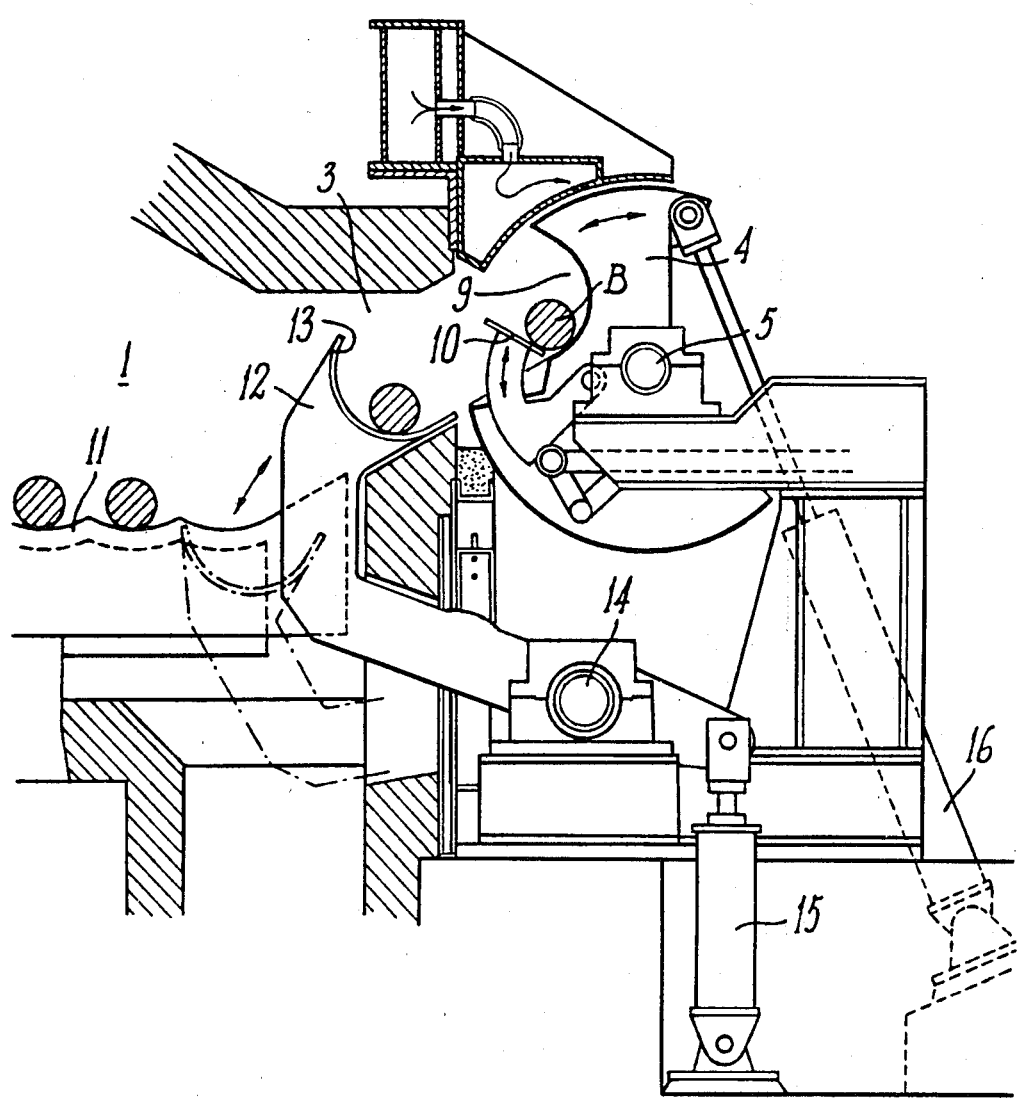
FIG. 1 is a sectional side view of a part of a heat treatment furnace fitted with a feeding device that is made in accordance with the invention.

Referring to FIG. 1, there is shown a walking beam furnace 1 that has a side wall in which a horizontal longitudinal opening 3 is provided. A drum 4 is arranged in front of the opening 3 and rotates around a horizontal axis 5. A longitudinal cavity 9 is formed in the drum periphery to receive a round tube or bar B.

A retractable stop 10 is provided in the cavity 9 to maintain the round bar in the cavity when the drum 4 rotates to a position for discharging the bar into the furnace 1 through the opening 3.

It is important to transfer the bars smoothly from the cavity 9 to the walking beams 11 of the furnace 1 to prevent damage of the walking beams upon abrupt and forceful contact with the bars as they are charged to the furnace. In this case, the transfer device comprises several arms 12, each of which has a generally U-shaped cavity 13 for receiving the bars. The arms 12 are articulated around a common axis 14 that is located outside the furnace. The arms 12 are driven or rotated, in unison, by one or several cylinders 15 which successively move the arms from the bar receiving portion, indicated in continuous lines, to the bar discharging position, indicated in chain-dotted lines.

In operation, the drum 4 is positioned so that the cavity 9 is ready for receipt of a round bar which is placed, by hand, in the cavity. The cylinders 16 are then actuated to rotate the drum 4 to the discharge position of FIG. 1. The stop 10 is retracted out of the cavity to release the bar and allow it to roll down the inclined face of the cavity into the cavities 13 of the upstretched arms 12. The cylinders 15 are subsequently operated to rotate the arms 12 to the position shown in chain-dotted line to gently transfer the bar onto the walking beams 11 of the furnace 1.

The retractable stop 10 works in conjunction with the articulated arms 12 to produce a gentle and smooth transfer of the bar from the drum cavity to the furnace without endangering and damaging the walking beams 11. It can be appreciated that any suitable means can be used to rotate the stop 10 into and out of the cavity 9 of the drum 4.

Figure 2:
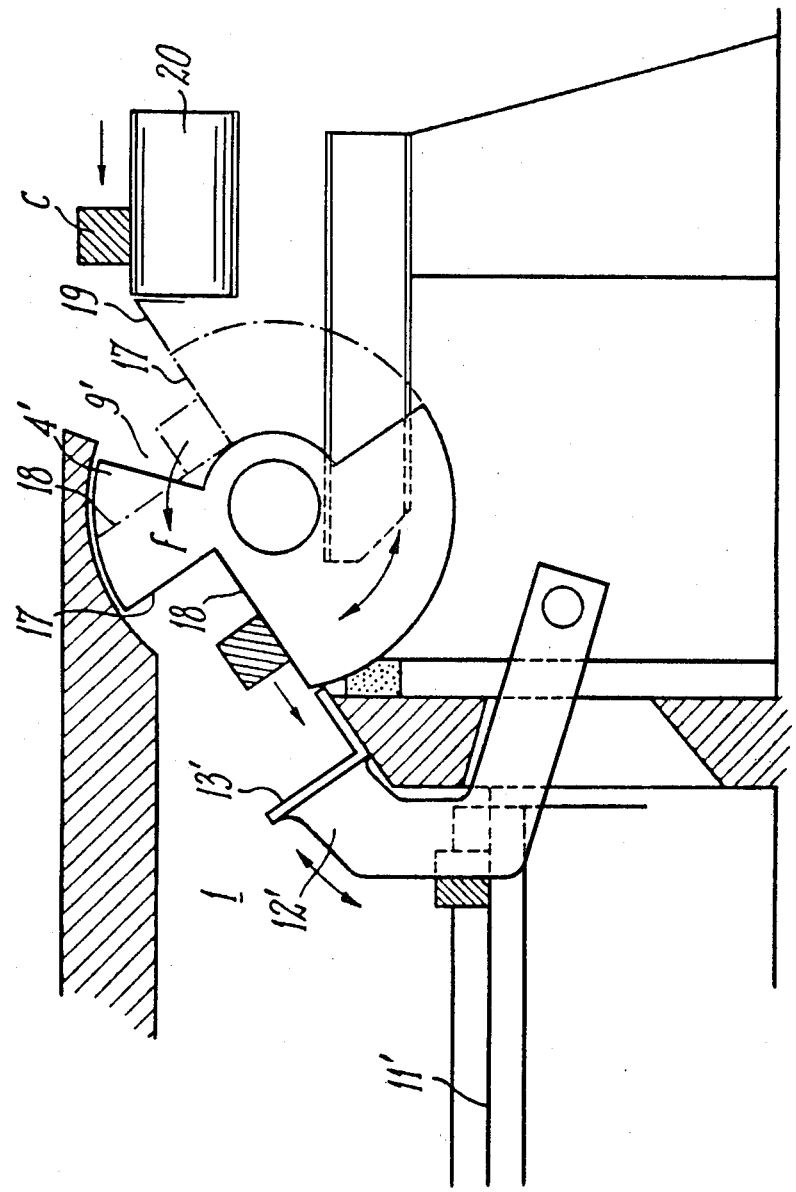
FIG. 2 is a sectional side view similar to that of FIG. 1 and is designed to show a drum with a uniquely shaped cavity for receiving material having a rectangular cross-section.

The drum 4' of FIG. 2 is designed to charge square bars into the furnace 1. The cavity 9' has a shape which is chosen so that the bars are charged and discharged by sliding over two planar surfaces 17,18 which are practically orthogonal. In this design there are also provided transfer arms 12' whose cavities 13' each have a right-angled profile. In operation, a square bar C supplied, for example, by a roller table 20, is conveyed via an inclined plane 19 to the cavity 9' of the drum by sliding over the planar surface 17, shown in chain-dotted line. The drum 4' is then rotated in the direction indicated by the arrow f until it reaches the position shown in continuous line. The bar slides downwardly over the inclined planar surface 18 into the adjacent angle-shaped cavities 13' of the articulated arms 12', after which arms 12' are rotated to transfer the bar gently down onto the walking beams 11' of the furnace.

Figure 3:
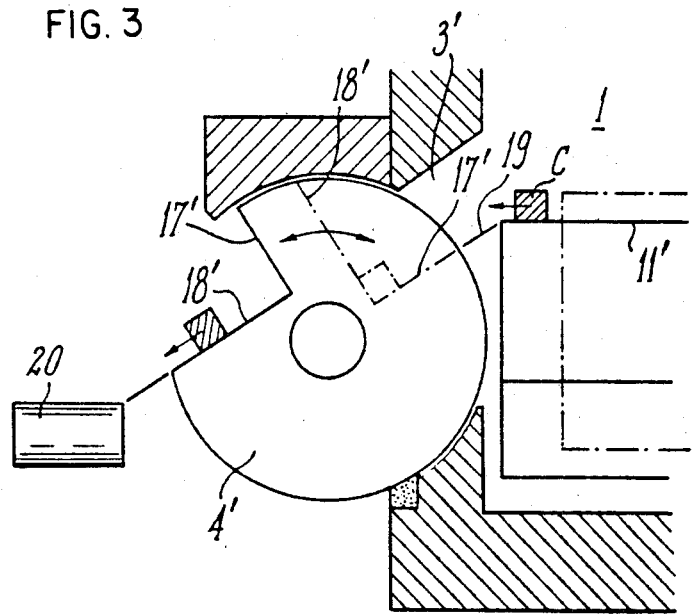
FIGS. 3 and 4 are sectional side views which are designed to show the application of the invention to the discharging of material from a furnace.
Figure 4:
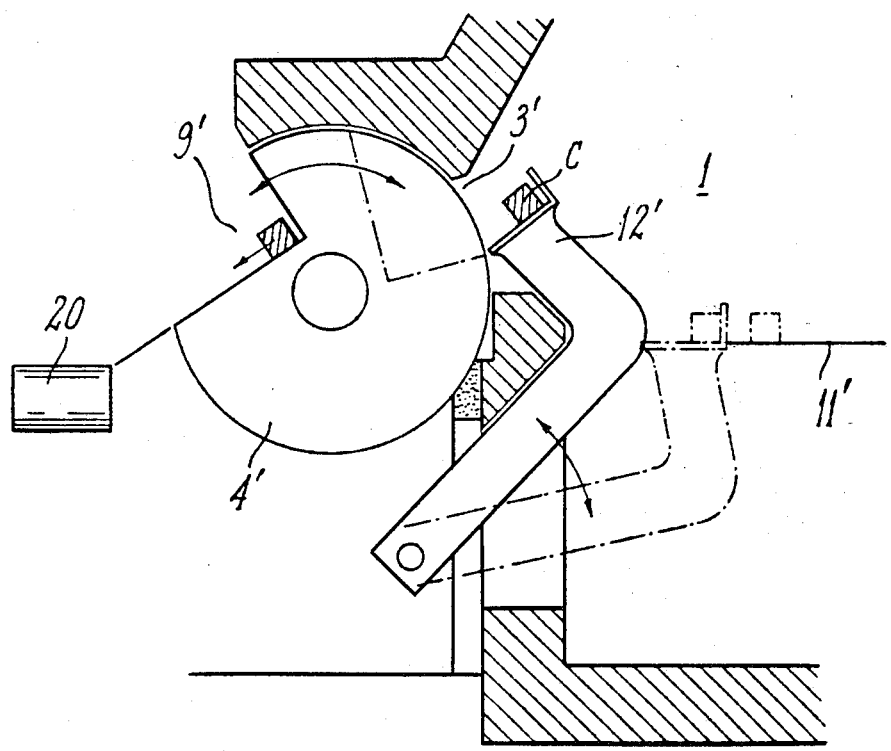

The above described transfer device, as best seen in FIGS. 2 and 3, can also be used to discharge heat treated bars from a furnace, such as the walking beam furnace 1. In FIG. 3, the furnace 1 is provided at its opening 3' with a feeding drum 4' with a cavity that has two practically orthogonal planar surfaces 17',18' similar to the drum cavity shown in FIG. 2. The walking beams 11' of the furnace place the bars on the downwardly inclined plane 19 where they slide directly into the drum cavity 4', shown in chain-dotted line. The drum is then rotated to the heavy line position where the bar C is free to slide down the inclined planar surface 18' of the cavity onto, for example, a roller table 20' located outside the furnace. In FIG. 4, the bar C is not conveyed, by gravity, from the furnace beams to the cavity 9' of the drum 4', but is picked up by several transfer arms 12' and transported to the cavity of the drum (note, positions of the drums and transfer arms shown in chain-dotted and continuous lines).

Thus, there is described a device which makes possible the charging and discharging of round or square bars or tubes into and out of a furnace without damaging the furnace, especially the support for the bars within the furnace.

What is claimed is:

1. An article handling apparatus for transferring articles to be heat treated smoothly and gently from a supply area to walking beams of a heat treating furnace, said article handling apparatus comprising:

a drum mounted for rotation about a substantially horizontal drum axis between an article receiving position and an article discharge position, said drum defining a longitudinal drum transfer cavity including an article receiving surface along which a received article slides by gravity with the drum in the article receiving position and a generally oppositely disposed article discharge surface along which the article is slidably discharge by gravity with the drum in the article discharge position;

at least one retractable stop associated with the drum for movement between a stop position projecting upwardly from the article discharge surface into the drum transfer cavity and displaced from the article receiving surface and a retracted position retracted at least level with the article discharge surface, wherein the article is slidably received under gravity along the article receiving surface into the drum transfer cavity without interference with the stop means when the retractable stop is in the stop position and the drum is in the article receiving position, the article is prevented from sliding under gravity from the drum transfer cavity when the retractable stop is in the stop position and the drum is in the article discharge position, and the article is slidably discharged by gravity from the drum transfer cavity when the retractable stop is in the retracted position and the drum is in the article discharge position;

at least one arm defining an arm transfer cavity adjacent one end, said arm being pivotally mounted for movement between a first position disposed above the walking beams adjacent the drum transfer cavity for receiving the article discharged from the drum transfer cavity in the article discharge position and a second position disposed below the walking beams; and, means for moving said arm in a controlled manner between said first and second positions for laying the article gently on the walking beams, whereby the walking beams are not damaged by impact on receipt of the article to be heat treated.

2. The article handling apparatus as set forth in claim 1 wherein said retractable stop is mounted for rotation about an axis which is disposed outside the drum transfer cavity and extends substantially parallel to the drum axis.

3. The article handling apparatus as set forth in claim 1 wherein the article receiving and article discharge surfaces of said drum transfer cavity comprise substantially planar surfaces disposed in a generally orthogonal relationship to each other.

4. An article handling system for transferring an article to be heat treated from an article source onto a conveying surface of a heat treating furnace and from the conveying surface of the heat treating furnace to adjacent conveying means, said article handling system comprising:

a first drum mounted adjacent the entrance end of said furnace for rotation about a first substantially horizontal axis between a first article receiving position and a first article discharge position, said first drum defining a longitudinal first drum transfer cavity including a first article receiving surface along which the article to be treated slides by gravity in the first article receiving position and a generally oppositely disposed first article discharge surface along which the article is discharged by gravity in the first article discharge position;

at least one retractable stop which is associated with the first drum for movement between a stop position projecting into the first drum transfer cavity through the first article discharge surface in a displaced relationship from the first article receiving surface and a retracted position retracted at least level with the first article discharge surface, such that the article is slidably received by gravity in the first drum transfer cavity without interference with the stop when said retractable stop is in the stop position and the first drum is in the first article receiving position, the article is stopped from discharge by gravity from the first drum transfer cavity when the retractable stop is in the stop position and the first drum is in the first article discharge position, and the article is discharged by gravity from the first drum transfer cavity when the retractable stop is in the retracted position and the first drum is in the first article discharge position;

a first arm defining a first arm transfer cavity adjacent one end thereof, said first arm being pivotally mounted for movement between a first article receiving position disposed above said furnace conveying surface adjacent the first article discharge surface for receiving the article to be heat treated from the first drum transfer cavity when said first drum transfer cavity is disposed in the first discharge position and a first article discharge position disposed below said first conveying surface;

means for moving said first arm in a controlled manner between said first article receiving and discharge positions to lay the article to be heat treated generally on the furnace conveying surface;

a second drum mounted adjacent the exit end of said furnace for rotation about a second substantially horizontal axis between a second article receiving position and a second article discharge position, said second drum defining a longitudinal second drum transfer cavity including a second article receiving surface which is disposed above the furnace conveying surface in said second article receiving position and slopes downwardly into the second drum transfer cavity such that the received article which has been heat treated slides by gravity along the second article receiving surface, said second drum further defining a second article discharge surface which slopes downwardly out of the second drum transfer cavity toward the roller table in the second article discharge position such that the heat treated article is discharged by gravity from the second drum transfer cavity to said adjacent conveying means; and, a second arm defining a second arm transfer cavity adjacent one end thereof, said second arm being pivotally mounted for movement between a second article receiving position wherein the second arm transfer cavity is disposed below the furnace conveying surface for receiving the heat treated article from the heat treating furnace and a second article discharge position wherein the second arm transfer cavity is disposed above the furnace conveying surface and adjacent the second drum transfer cavity, said second arm being tipped in said second article discharge position such that the heat treated article is transferred by gravity from the second arm transfer cavity to the article receiving surface of said second drum transfer cavity.

* * * * *